United States Patent [19]

Tanaka

[11] Patent Number: 4,506,587

[45] Date of Patent: Mar. 26, 1985

[54] METHOD OF PROCESSING DATA FOR MUSICAL SCORE DISPLAY SYSTEM

[75] Inventor: Kazurou Tanaka, Hamamatsu, Japan

[73] Assignee: Nippon Gakki Seizo Kabushiki Kaisha, Hamamatsu, Japan

[21] Appl. No.: 504,395

[22] Filed: Jun. 15, 1983

[30] Foreign Application Priority Data

| | | | |
|---|---|---|---|
| Jun. 18, 1982 | [JP] | Japan | 57-104719 |
| Jun. 23, 1982 | [JP] | Japan | 57-107838 |
| Jun. 23, 1982 | [JP] | Japan | 57-107839 |
| Jun. 25, 1982 | [JP] | Japan | 57-109268 |

[51] Int. Cl.$^3$ ........................ G10G 3/04; G09B 15/02

[52] U.S. Cl. .................................... 84/462; 84/477 R

[58] Field of Search ................. 84/462, 470 R, 477 R, 84/478, 483 R, 483 A, DIG. 6, 471 R, 472

[56] References Cited

U.S. PATENT DOCUMENTS

| | | | |
|---|---|---|---|
| 3,926,088 | 12/1975 | Davis et al. | 84/462 |
| 4,022,097 | 5/1977 | Strangio | 84/462 |
| 4,213,372 | 7/1980 | Sasaki et al. | 84/470 R |

FOREIGN PATENT DOCUMENTS

| | | | |
|---|---|---|---|
| 30-45040 | 3/1955 | Japan . | |
| 2064851 | 6/1981 | United Kingdom | 84/462 |

*Primary Examiner*—William B. Perkey
*Attorney, Agent, or Firm*—Spensley, Horn, Jubas & Lubitz

[57] ABSTRACT

There is disclosed a method of processing data for a musical score display system for displaying a musical score in accordance with depression of keys on a keyboard of a musical instrument. Key information containing a key depression timing, a key release timing and a name of key is detected with respect to two keys depressed one after another. When a period between the key depression timings of the two keys is very short, the two keys are displayed as depressed simultaneously. When the succeeding key is depressed before release of the preceding key and the difference in depression timing of the two keys is greater than a certain period, a rest note is displayed before a musical note corresponding to the succeedingly depressed key.

5 Claims, 17 Drawing Figures

METHOD OF PROCESSING DATA FOR MUSICAL SCORE DISPLAY SYSTEM

BACKGROUND OF THE INVENTION

1. Field of the Invention

This invention relates to a musical score display system for automatically displaying a musical score representative of a musical performance effected by an associated musical keyboard instrument such as a piano and an electronic organ.

2. Prior Art

In conventional musical score display systems under consideration, musical notes corresponding to actuated or depressed keys are displayed at equal intervals on an associated display device irrespective of the kind of the musical notes. However, in order to provide a musical score properly representing a musical performance, it is desirable that when two keys A and B are successively actuated or depressed, two musical notes corresponding respectively to the depressed keys A and B should be displayed on the display device at an interval or distance corresponding to a time difference of the actuation of the two keys A and B. In this case, however, the following difficulties are encountered:

(a) Strictly, even when the performer of the musical keyboard thinks that he has depressed two keys A and B simultaneously, there frequently occurs a slight time difference $\Delta T$ between the depressions of the two keys A and B. If such time difference is transmitted to the display device, the musical score displayed on the display device does not suitably represent the musical performance intended by the player.

(b) As shown in FIG. 1, key $C_3$ (a key representative of tone C in the third octave) is depressed at time $t_1$, and then key $C_4$ is depressed at time $t_2$. Then, keys $E_4$ and $D_5$ are depressed at time $t_3$ simultaneously with the release of the depressed keys $C_3$ and $C_4$. In this case, a musical note corresponding to key $C_3$ is first displayed on a display device showing a staff notation. Then, a note corresponding to key $C_4$ is displayed on the display device and spaced from the note representative of key $C_3$ by a distance corresponding to a quarter note. Then, notes corresponding respectively to keys $E_4$ and $D_5$ are displayed on the display device and spaced from the note representative of key $C_4$ by a distance corresponding to a quarter note. With this method, however, the time interval between the depressions of keys $C_3$ and $C_4$ is not properly displayed in the musical score.

Further, when the distance between the adjacent notes displayed on the display device is determined only by the duration of such notes, the following difficulties arise when a plurality of tones are simultaneously produced by the keyboard, for example, to produce a polyphony:

As shown in FIG. 2A, a musical performance is effected in such a manner that a tone representative of a quarter note $C_4$ is generated during the generation of a tone representative of a half note $C_3$. In this case, in the displayed musical score, the interval or distance $L_1$ between the notes $C_3$ and $C_4$ and the interval $L_2$ between the notes $C_4$ and $E_4$ should correspond to a distance corresponding to a duration of a quarter note. Actually, however, when such intervals are determined by the duration of the notes, the intervals correspond respectively to durations of half and quarter notes, as shown in FIG. 2B, these intervals being designated at $L_3$ and $L_4$. Thus, the musical score displayed in the display device does not coincide with the actual musical performance effected by the keyboard.

SUMMARY OF THE INVENTION

It is therefore an object of this invention to provide a method of processing data for a musical score display system in which even if a plurality of keys of a keyboard to be actuated simultaneously are actually depressed in a slightly different timing, musical notes corresponding to the depressed keys are displayed on a display device in such a manner that they have been depressed simultaneously, thereby providing a musical score representation corresponding to an intended musical performance.

Another object is to provide such a method in which when one key is depressed during the depression of another key, a rest indicative of an time interval between the two depressed keys is displayed in a musical score on a display device.

A further object is to provide such a method in which notes corresponding respectively to depressed keys are displayed in a musical score at intervals or distances corresponding to durations of depression of the keys.

A still further object is to provide such a method in which notes corresponding to depressed keys are displayed in a musical score on a display device at an interval corresponding to a time interval between two successive events (time of depression or release of the key).

According to one aspect of the present invention, there is provided a method of processing data for a musical score display system for displaying a musical score in accordance with depression of keys on a keyboard of a musical instrument which comprises detecting key information containing a key depression timing, a key release timing and a name of a first key among the keys; detecting the key information with respect to a second key depressed after the depression of the first key; determining a period between the key depression timings of the first and second keys; forming performance data which represents that the first and second keys are depressed simultaneously at a same timing if the period is less than a predetermined reference period and represents that the first and second keys are depressed successively at different timings if the period is not less than the reference period; and converting the performance data to display data suitable for displaying a musical score on a display device. If the determined period is greater than another predetermined reference period, rest data representative of a rest indicative of the determined period is produced, so that a rest note is displayed on the display device.

DESCRIPTION OF PREFERRED EMBODIMENTS

Figure 1:
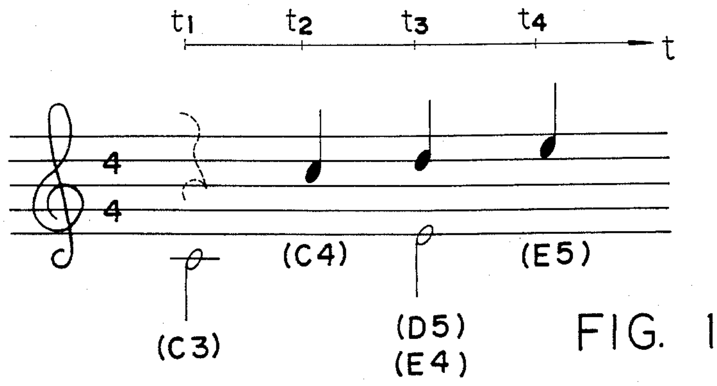
FIGS. 1, 2A and 2B are illustrations showing musical scores.
Figure 2A:
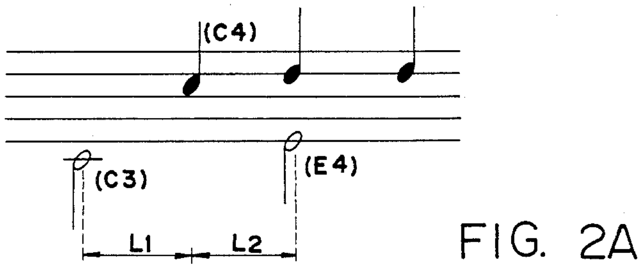
Figure 2B:
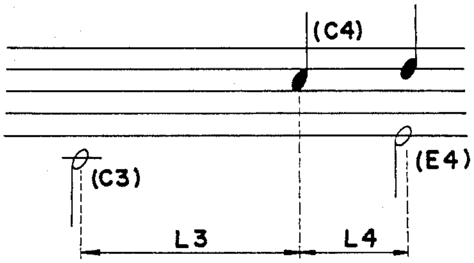
Figure 3:
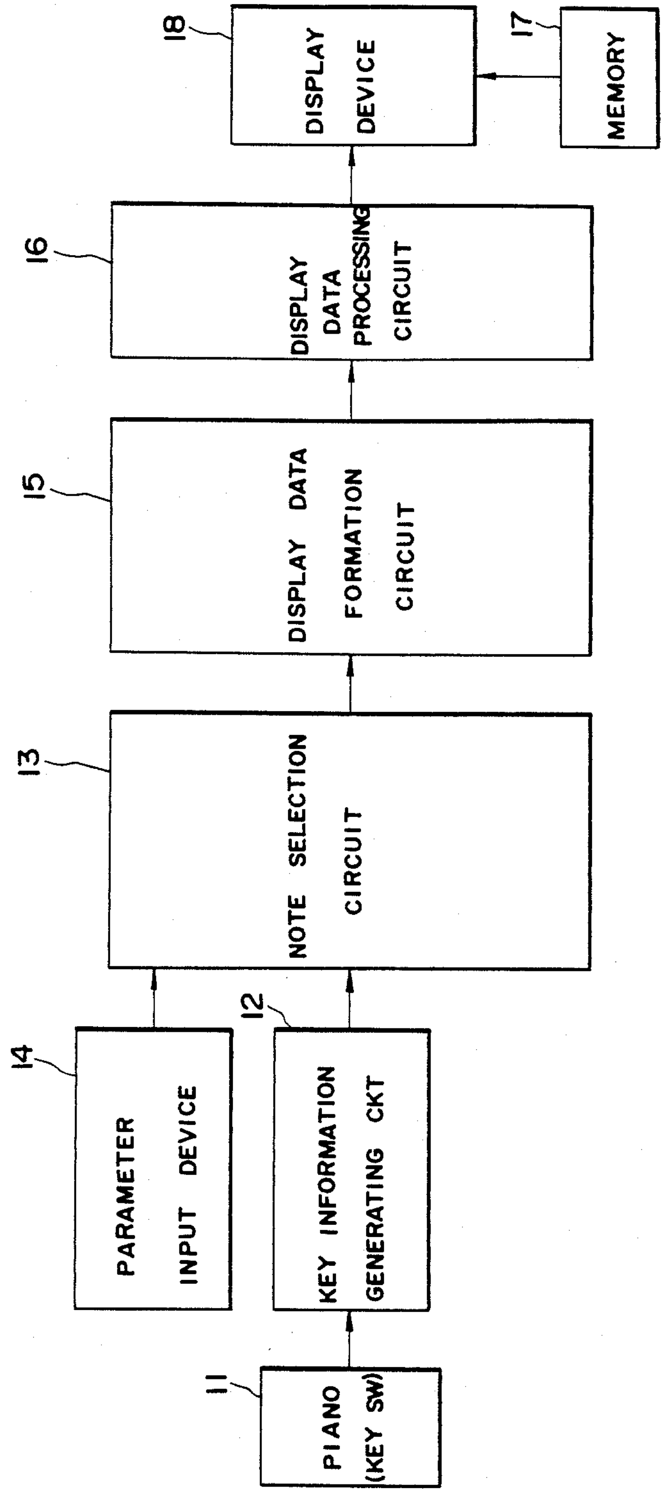
FIG. 3 is a block diagram of a musical score display system for performing a display method according to the present invention.

FIG. 3 shows a block diagram of a musical score display system provided in accordance with the present invention. This musical score display system is designed to automatically display a musical score representative of a musical performance effected by a piano 11. Each key of the piano 11 has a key switch which produces an output signal upon depression of the key in a well known manner. The output from each key switch is sent to a key information generating circuit 12.

Figure 4A:
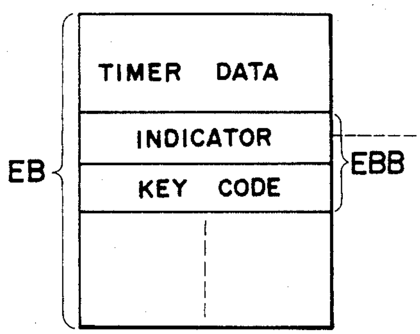
FIG. 4A is a diagrammatic illustration showing an event block.
Figure 4B:
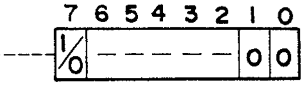
FIG. 4B is a diagrammatic illustration showing a portion of the event block of FIG. 4A.

The key information generating circuit 12 comprises scanning means for scanning each key switch periodically to detect on-off states thereof, timer means, storage means for temporarily storing the outputs from the scanning means and the timer means, and control means. The control means detects a change in the on-off states of each key (hereinafter referred to as "event") to produce an event block EB (FIG. 4A). The event block EB is formed using at least four successive bytes in the storage means. A timer data representative of a period between the preceding event and the present event is written into the first and second ones of the above-mentioned four bytes. An indicator is written into the third byte, as shown in FIG. 4B. Also, a key code identifying the key having event, that is, depressed or released at this time is written into the fourth byte. In this case, the timer data of the event block EB produced when one of the keys of the piano 11 is first depressed is "0". Data representative of the on-off states of each key is written into MSB (8th bit) of the indicator. The data indicative of the on-state is written in the form of "1" while the data indicative of the off-state is written in the form of "0". Usually, "0" is written into both LSB and the second bit of the indicator. The third to seventh bits of the indicator are not used for data writing. When the time interval between the consecutive events exceeds the maximum time period which can be represented by the total of the bits of the timer data, another event block EB of a similar form is produced at this time through the above-mentioned control means. In this case, LSB and the second bit of this indicator are "1" and "0", respectively.

There are occasions when a plurality of events are produced simultaneously. In such a case, blocks corresponding to the generated events are produced in the event block. For example, when one key is depressed simultaneously with the release of another key, two blocks EBB corresponding to these two keys and composed of the indicator and the key code shown in FIG. 4A are produced and stored in the above-mentioned storage means.

Figure 5:
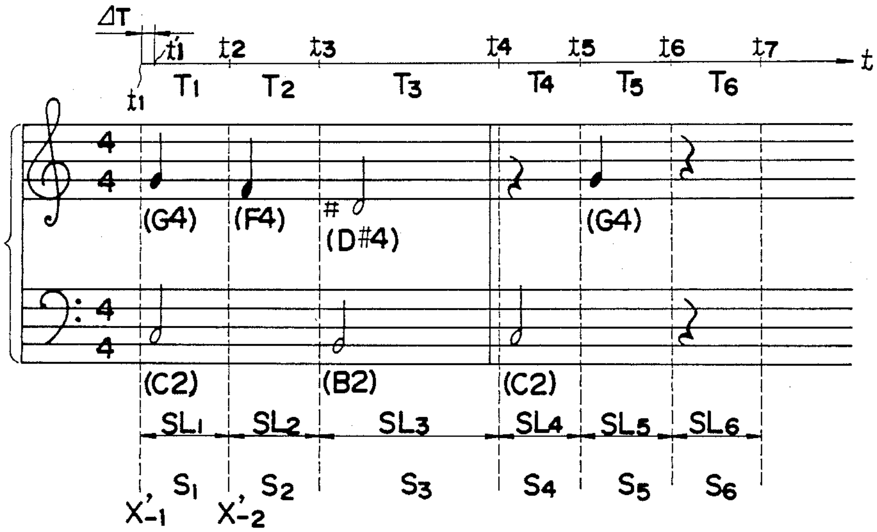
FIG. 5 is an illustration showing a musical score.
Figure 6:
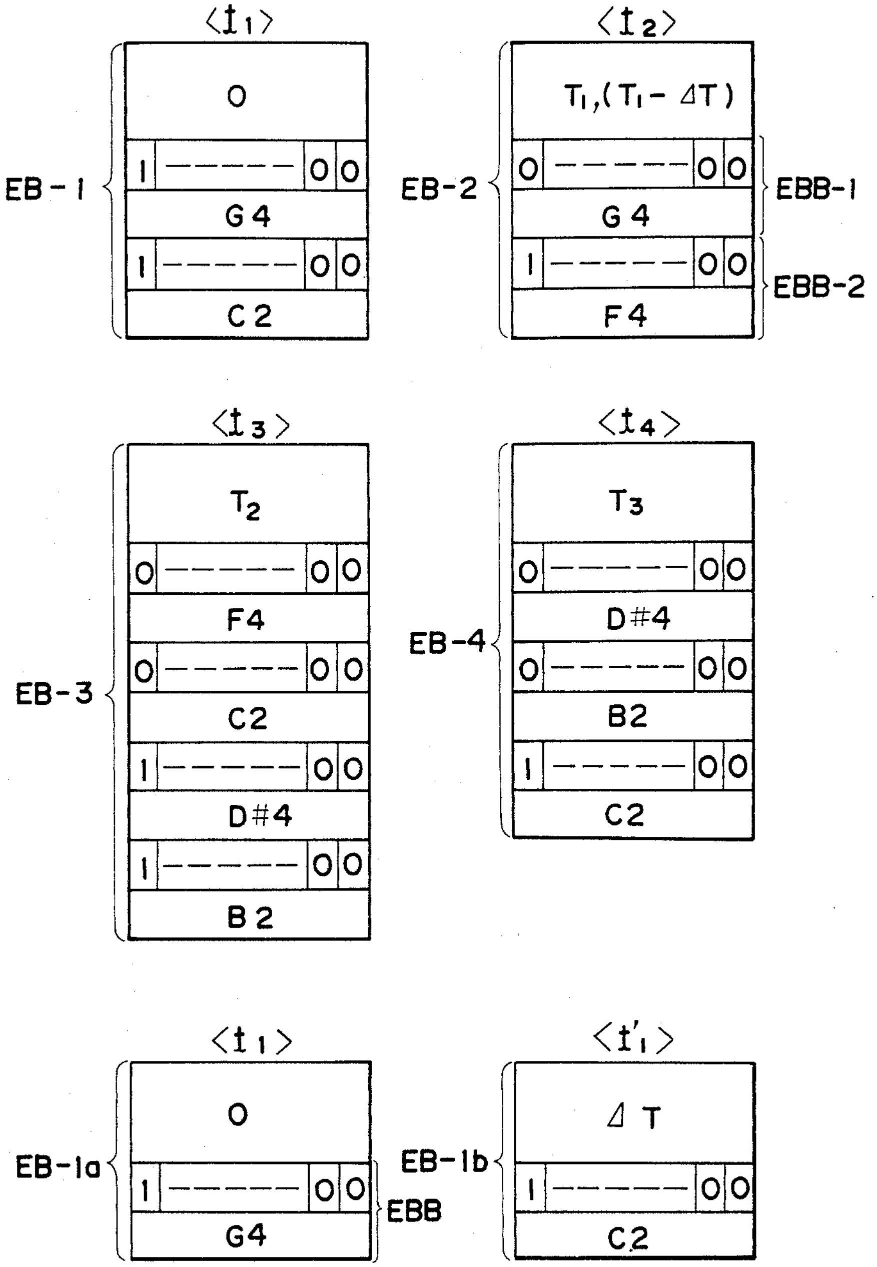
FIG. 6 is a diagrammatic illustration showing event blocks produced when a musical performance is effected in accordance with the musical score of FIG. 5.

FIG. 5 shows one example of musical score. For example, in FIG. 5, key G4 (a key representative of tone G in the fourth octave) and key C2 are simultaneously depressed at time $t_1$, and key G4 is released simultaneously with the depression of key F4 upon lapse of time $T_1$ from time $t_1$, that is, at time $t_2$. Then, keys D♯4 and B2 are depressed simultaneously with the release of keys F4 and C2 upon lapse of time $T_2$ from time $t_2$, that is, at time $t_3$. Then, key C2 is depressed simultaneously with the release of keys D♯4 and B2 upon lapse of time $T_3$ from time $t_3$, that is, at time $t_4$. In this case, as shown in FIG. 6, event blocks EB-1 to EB-4 are produced at times $t_1$ to $t_4$, respectively. The term "simultaneously" described above means "completely simultaneously".

Also, for example, when only key G4 is depressed at time $t_1$, with key C2 being depressed upon lapse of a small time $\Delta T$ (for example, 10 msec. ) from $t_1$, that is, at time $t'_1$, an event block EB-1*a* (FIG. 6) is produced at time $t_1$ instead of the event block EB-1, and also an event block EB-1*b* is produced at time $t'_1$. In this case, the timer data of the event block EB-2 produced at time $t_2$ is $(T_1-\Delta T)$. The event blocks EB produced in the above-mentioned manner are supplied to a note selection circuit 13 sequentially.

A parameter input device 14 comprises a number of switches or the like which are selectively operated to input data, representative of the kind of key (for example, C-major, A-minor or the like), tempo (for example, a duration of a quarter note or the number of quarter notes per minute) and a meter (for example, quadruple), to the note selection circuit 13.

Figure 7:
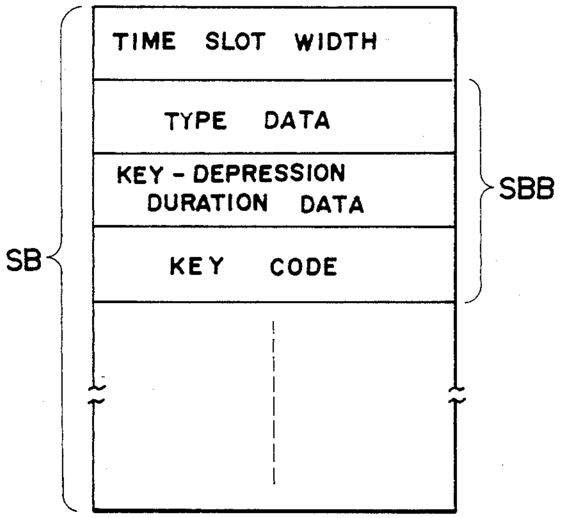
FIG. 7 is a diagrammatic illustration showing a slot block.

The note selection circuit 13 detects the on-off states of each key of the piano 11 in accordance with the event block EB supplied from the key information generating circuit 12 to produce a slot block SB (FIG. 7). This slot block SB is inputted to a display data formation circuit 15.

Figure 8:
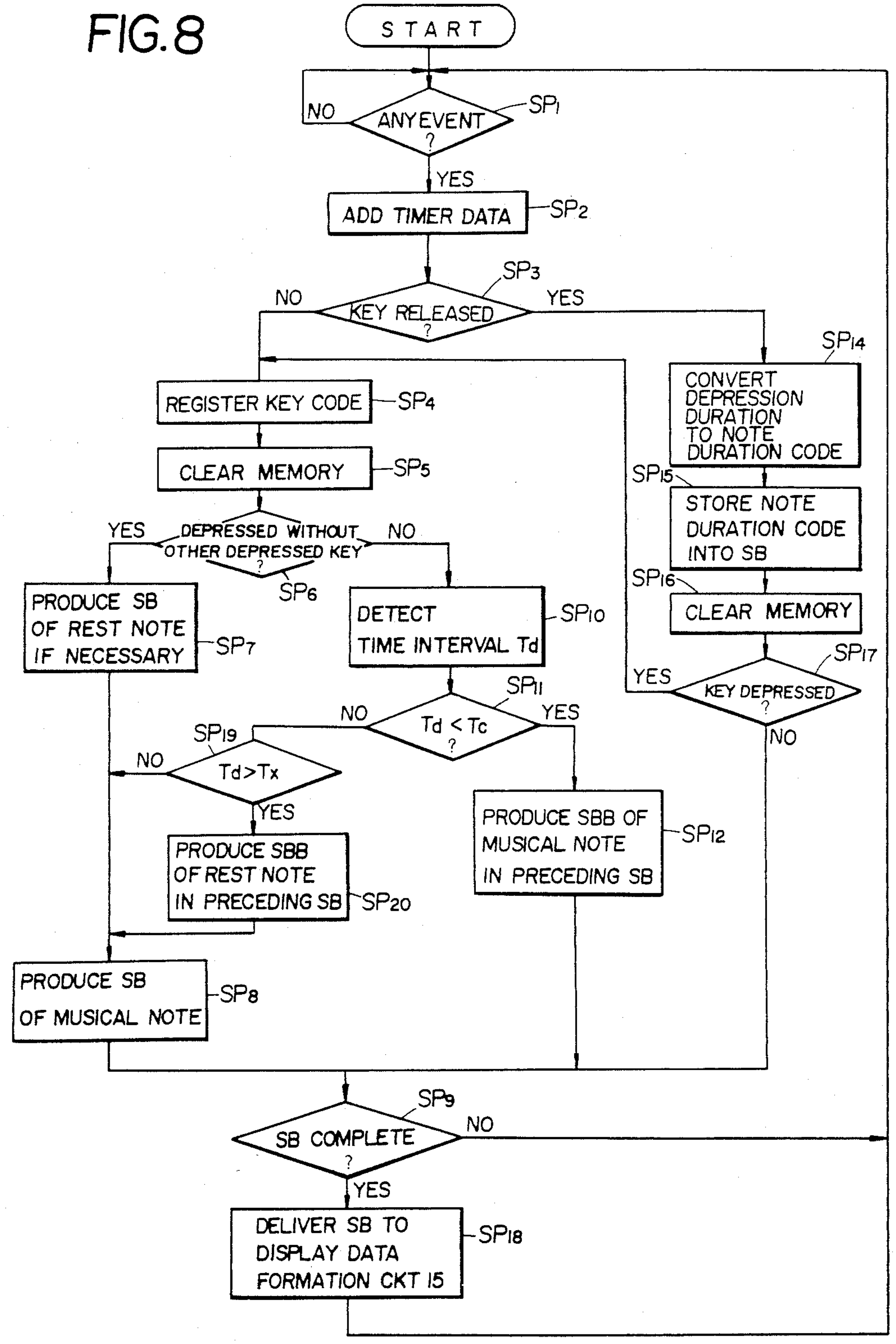
FIG. 8 is a flow chart showing the process of producing display data.

The note selection circuit 13 comprises control means for effecting a data processing in accordance with a procedure shown in a flow chart of FIG. 8, and memory M (FIG. 9) for the writing of the slot blocks SB.

The note selection circuit 13 will now be described in more detail. When a musical performance is carried out by the piano 11 in accordance with the musical score shown in FIG. 5, the musical score display system shown in FIG. 3 can display this musical score in the form shown in FIG. 5. The note selection circuit 13 produces the data, which is necessary for displaying the musical score. in the form of slot blocks SB corresponding respectively to time slots $S_1$ to $S_6$ shown in FIG. 5. FIG. 7 shows a structure of the slot block SB, and a note duration code representative of the width ($SL_1$ to $SL_6$) (FIG. 5) of the time slot ($S_1$ to $S_6$) is written into the first byte of the slot block. Also, type data, a key-depression duration data, and a key code of the key concerned are written into the second to fourth bytes of the slot block SB, respectively. In this case, the block SBB composed of the second to fourth bytes corresponds to the notes and/or the rests in the time slots $S_1$ to $S_6$. For example, in the case of the time slot $S_1$ shown in FIG. 5, two blocks SBB corresponding respectively to the two notes are produced. Also, in the case of the time slot $S_2$, one block SBB is produced. The type data is written into the block in the form of "1", "2" or "3". More specifically, when the block SBB represents a note, "1" is written thereinto. When the block SBB represents a rest indicative of the time interval between two consecutive key depressions such as one in the time slot $S_4$ in FIG. 5, "2" is written thereinto. Further, when the block SBB represents a rest used while no sound is generated, such as one in the time slot $S_6$, "3" is written thereinto. The note duration code corresponding to a note or a rest is written into the block as the key-depression duration data. The note duration codes are assigned in accordance with the durations of notes or rests. In this embodiment, for example, the note duration codes LN1, LN2, LN4 . . . represent a whole note or a whole rest, a half note or a half rest, a quarter note or a quarter rest, respectively. When the block SBB represents a note, the key code representative of this note is written into the block. Also, when the block SBB represents a rest, either the key code of the note following this rest or "0" is written into the block. More specifically, when the type data is "2", the key code of the note is written, and when the type data is "3", "0" is written.

The process of producing the above-mentioned slot block SB will be described with reference to the flow chart in FIG. 8.

For example, when the event block EB-1*a* (FIG. 6 is produced at time $t_1$ (FIG. 5) and is supplied to the note selection circuit 13, this event block is detected at stage $SP_1$. Then, at stage $SP_2$, the timer data of the event block EB-1*a* is added to the data stored in areas $A_{1a}$ to $A_{5a}$ of the memory M (FIG. 9) incorporated in the note selection circuit 13. The memory M remains cleared at the initial condition. In this case, the addition of the timer data is effected only when the data is stored in any one of the areas $A_{1b}$ to $A_{5b}$. Therefore, this addition is not effected at this stage.

Figure 9:
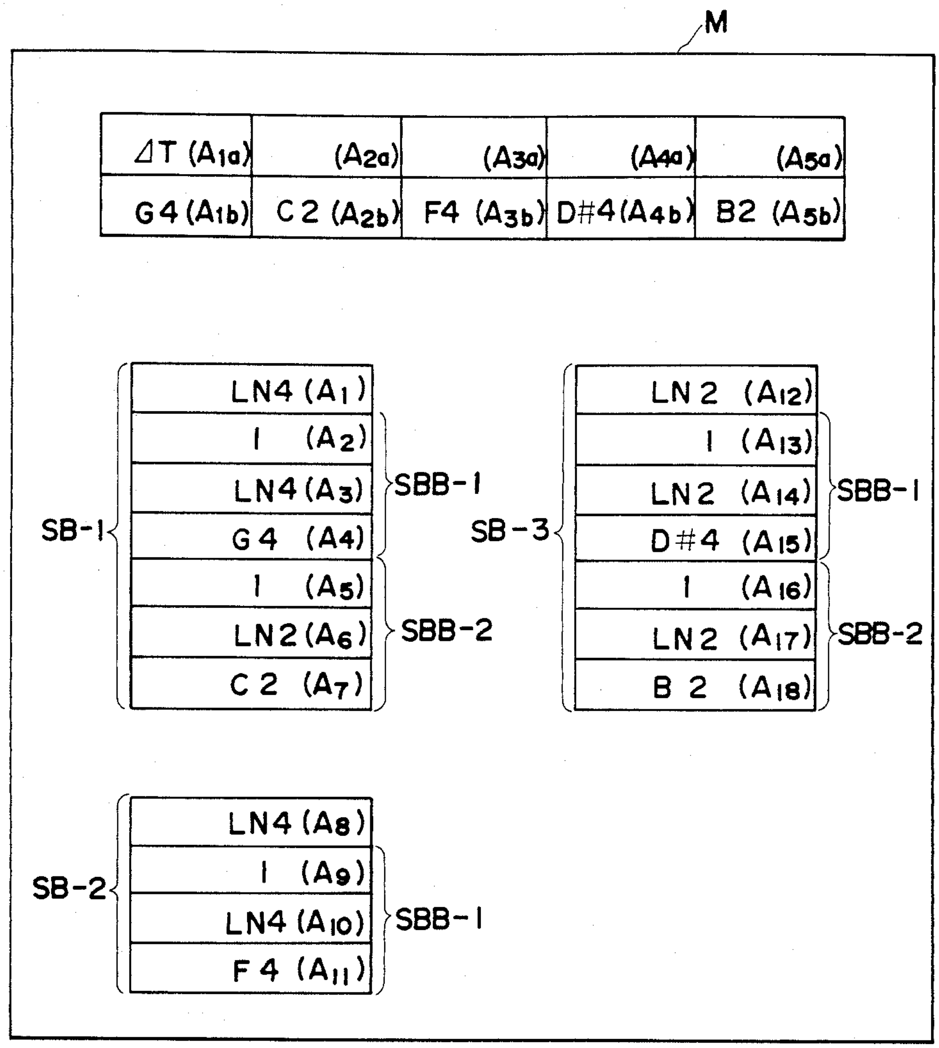
FIG. 9 is a diagrammatic illustration showing slot blocks produced in accordance with the event blocks of FIG. 6.

Then, at stage $SP_3$ it is detected whether the key concerned is in the off-state, that is to say, whether there is any block EBB of the event block EB-1*a* having the indicator of which MSB is in the state of "0". In this embodiment, there is no such block EBB representative of the key-off state, and therefore this processing proceeds to stage $SP_4$. Naturally, when there is no such event block representative of the key-off state, there always exist one or more blocks EBB representative of the key-on state. At stage $SP_4$, the key code of newly depressed key is registered into the memory M. More specifically, the key code of the event block EB-1*a* corresponding to key G4 is registered into area $A_{1b}$ of the memory M. Then, at stage $SP_5$ area $A_{1a}$, corresponding to area $A_{1b}$ into which the key code has been written, is cleared. Then, at stage $SP_6$ it is detected whether the key is newly depressed while no other sound is generated or while another preceding sound is produced. In this embodiment, key G4 is depressed while no sound is generated. Then, the processing proceeds to stage $SP_7$ at which there is produced a slot block representative of a rest corresponding to a time interval between the depression of the newly depressed key and the release of the last released key. At this stage, in the case where this newly depressed key is one depressed firstly at the beginning of the musical performance, such slot block is not produced. In this embodiment, key G4 is first depressed at the beginning of the musical performance so that the timer data is "0". Therefore, no further processing is effected at this stage $SP_7$. Then, the processing proceeds to stage $SP_8$ at which the slot block SB-1 representative of the note corresponding to the depressed key G4 is produced. More specifically, "1" is first written as the type data into area $A_2$ of the memory M (FIG. 9). Then, the key code of key G4 is written into area A4 of the memory M. Then, the processing proceeds to stage $SP_9$ at which it is determined whether the slot block SB in the memory M is completed. In this embodiment, the slot block SB-1 has not yet been completed, and therefore the processing returns to stage $SP_1$. The note selection circuit 13 effects the above processing upon receipt of the event block EB-1*a*.

Next, when the event block EB-1*b* is produced at time $t'_1$ and is supplied to the note selection circuit 13, at stage $SP_2$ the timer data representative of a time period $\Delta T$ is added to the data in the area $A_{1a}$ corresponding to the area $A_{1b}$ storing the key code, so that the data in the area $A_{1a}$ is rendered "$\Delta T$". Then, the processing proceeds through stage $SP_3$ to stage $SP_4$ at which the key code of key C2 in the event block EB-1*b* is written into area $A_{2b}$ of the memory M. Then, area $A_{2a}$ of the memory M is cleared at stage $SP_5$. Then, the processing proceeds to stage $SP_6$ at which it is determined whether key C2 is depressed while any preceding sound is produced. In this embodiment, the key code of the precedingly depressed key G4 has already been stored in the area $A_{1b}$. Therefore, the processing proceeds to stage $SP_{10}$ at which the time interval Td between the newly depressed key C2 and the precedingly depressed key is detected. In this embodiment, the precedingly depressed key is key G4, and this time interval Td is $\Delta T$ written as the data into the area $A_{1a}$. Therefore, it is detected that Td is equal to $\Delta T$ (i.e., $Td = \Delta T$). Then, the processing proceeds to stage $SP_{11}$ at which the time interval Td is compared with a predetermined reference time Tc (For example, 20 msec.). In this case, if "$\Delta T = 10$ msec." is established, then "$Td < Tc$" is provided. Therefore, the processing proceeds to stage $SP_{12}$ at which the block SBB representative of the newly depressed key C2 is produced in the slot block SB-1 representative of the last depressed key G4. More specifically, "1" is written as the type data into area $A_5$ of the memory M, and the key code of key C2 is written into area $A_7$ of the memory M. Thus, if "$Td < Tc$" is provided, this processing compensates for the slight time interval between the depressions of the two keys C2 and G4 in order that these two keys are deemed to have been depressed simultaneously for display purposes. The processing then returns to stage $SP_1$ via stage $SP_9$.

Next, when the event block EB-2 is produced at time $t_2$ and supplied to the note selection circuit 13, at stage $SP_2$ the timer data representative of "$T_1 - \Delta T$" is added to each of areas $A_{1a}$ and $A_{2a}$ corresponding to area $A_{1b}$ and $A_{2b}$ storing the key codes, so that the contents of the areas $A_{1a}$ and $A_{2a}$ are rendered $T_1$ and $(T_1 - \Delta T)$, respectively.

Then, at stage $SP_3$, it is determined whether there is in the event block EB-2 any block EBB representative of the key-off state. In this embodiment, the block EBB-1 of the event block EB-2 represents the off-state of the key G4. Therefore, the processing proceeds to stage $SP_{14}$ at which the time period of the on-state of the released key is converted into the note duration code. In this embodiment, the on-state or depression duration $T_1$ of the released key G4 is stored in area $A_{1a}$ of the memory M. Therefore, at stage $SP_{14}$ the data representative of $T_1$ stored in the area $A_{1a}$ is read out. This read out data corresponds substantially to the duration of a quarter note so that this data is converted into a note duration code LN4. Then, the processing proceeds to stage $SP_{15}$ at which the note duration code LN4 obtained at stage $SP_{14}$ is first written as the width of the time slot into area $A_1$ and then written as the key-depression duration data of key G4 into area $A_3$.

Then, the processing proceeds to stage $SP_{16}$ at which the areas $A_{1a}$ and $A_{1b}$ corresponding to the released key G4 are cleared. Then, the processing proceeds to stage $SP_{17}$ at which it is determined whether there is in the event block EB-2 any block EBB representative of the on-state of the key. In this embodiment, the event block EB-2 has the block EBB-2 representative of the on-state of key F4. Therefore, the processing proceeds to stage $SP_4$ at which the key code of key F4 is written into area $A_{3b}$ of the memory M. Then, at stage $SP_5$ the area $A_{3a}$ is cleared. Then, the processing proceeds to stage $SP_6$ at which the result of the detection is "NO" since key C2 is being depressed at this time. Therefore, the processing proceeds to stage $SP_{10}$ at which the time interval Td between the depressions of the two keys F4 and C2 is detected. In this case, the time interval Td is "$T_1-\Delta T$" stored as the timer data in the area $A_{2a}$ of the memory M. Then, at stage $SP_{11}$ the time interval Td, i.e., "$T_1-\Delta T$" is compared with the predetermined reference time Tc. In this case, "$T_1-\Delta T$" is greater than Tc, and therefore the processing proceeds to stage $SP_{19}$. At this stage $SP_{19}$ the time interval Td is compared with another reference time Tx, in this embodiment this reference time Tx being greater than the time duration of a thirty-second note and less than that of a sixteenth note. Since the time interval Td is substantially equal to the time duration of a quarter note, the processing proceeds to stage $SP_{20}$. This stage serves to produce a rest, which corresponds to the time interval Td, in a slot block preceding the slot block corresponding to a newly depressed key, provided that the newly depressed key is not depressed simultaneously with the release of the precedingly depressed key. In this case, the key F4 has been depressed simultaneously with the release of the key G4. Therefore, no processing is effected at this stage and the processing proceeds to stage $SP_8$ at which a slot block SB-2 (FIG. 9) corresponding to the time slot $S_2$ (FIG. 5) is produced. More specifically, "1" is written into area $A_9$ of the memory M, and the key code of key F4 is written into area $A_{11}$ of the memory M. Then, the processing proceeds to stage $SP_9$ at which it is determined whether each of the slot blocks SB-1 and SB-2 is completed. In this embodiment, the result is "NO", and therefore the processing returns to stage $SP_1$.

Next when the event block EB-3 is produced at time $t_3$ and is supplied to the note selection circuit 13, at stage $SP_2$ the timer data representative of $T_2$ is first added to each of the areas $A_{2a}$ and $A_{3a}$ of the memory M. As a result, the contents of the areas $A_{2a}$ and $A_{3a}$ are rendered "$T_1-\Delta T+T_2$" and "$T_2$", respectively. Then, at stage $SP_{14}$ the time periods of the on-state of the released keys F4 and C2 are converted into respective note duration codes. In this embodiment, the on-state time period "$T_1-\Delta T+T_2$" of key C2 corresponds substantially to a duration of a half note. Therefore, it is converted into a note duration code LN2. Also, the time period $T_2$ of the on-state of key F4 is converted to a note duration code LN4 corresponding to a duration of a quarter note. Then, the note duration code LN2 is written into area $A_6$ of the memory M corresponding to a slot block SB-1, and the note duration code LN4 is written into each of areas $A_8$ and $A_{10}$ corresponding to a slot block SB-2 (stage $SP_{15}$). Thus, both the slot blocks SB-1 and SB-2 are completed at time $t_3$. Then, the areas $A_{2a}$, $A_{2b}$, $A_{3a}$ and $A_{3b}$ corresponding to the released keys F4 and C2 are cleared at stage $SP_{16}$. Then, at stage $SP_4$ the key codes of the depressed keys D♯4 and B2 are written into areas $A_{4b}$ and $A_{5b}$ of the memory M, respectively. Then, the processing proceeds to stage $SP_7$ via stages $SP_5$ and $SP_6$. In this embodiment, the time at which keys F4 and C2 are released coincides with the time at which keys D♯4 and B2 are depressed. Therefore, the slot block representative of a rest is not produced, and the processing proceeds to stage $SP_8$ at which part of the slot block SB-3 (FIG. 9) is produced. The result of the detection at the next stage $SP_9$ is "YES", and therefore the processing proceeds to stage $SP_{18}$ at which the produced slot blocks SB-1 and SB-2 are sequentially fed to the display data formation circuit 15 (FIG. 3). Then, the processing returns to stage $SP_1$.

Then, the above-mentioned procedure is repeated, and the slot blocks SB-3, SB-4 . . . corresponding respectively to the time slots $S_3$, $S_4$ . . . are sequentially produced. The thus produced slot blocks are sequentially supplied to the display data formation circuit 15. After areas $A_{5a}$ and $A_{5b}$ of the memory M have been used for writing purposes, areas $A_{1a}$ and $A_{1b}$ are used.

Thus, the note selection circuit 13 produces the slot blocks SB in response to the event blocks EB sequentially supplied thereto. In this case, when the time interval Td between the last depressed key and the newly depressed key is less than the reference time Tc, the block SBB representative of this newly depressed key is produced in the slot block SB representative of the last depressed key. Therefore, the processing is effected in such a manner that these two keys are deemed to have been depressed simultaneously for display purposes.

Figure 10:
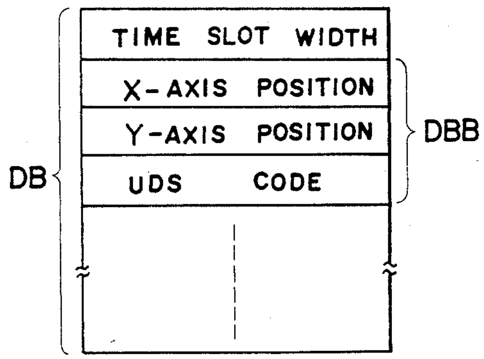
FIG. 10 is a diagrammatic illustration showing a display block.

The display data formation circuit 15 produces display blocks DB (FIG. 10) in response to the slot blocks SB applied from the note selection circuit 13 thereto, the display blocks being representative of a note, a rest and so on. The display data formation circuit 15 comprises means for converting the slot blocks SB into the display blocks DB and storage means for storing the results of such conversion. As shown in FIG. 10, the display block DB is composed of at least four bytes of the storage means. The width data of the time slot of the slot block SB is written into the first byte, and X-axis position data (abscissa) of the display element, Y-axis position data (ordinate) of the display element and UDS code are written into the second to fourth bytes, respectively. Blocks DBB of the display block DB correspond to the respective blocks SBB of the slot block SB. The X-axis position data written into the display block DB represents the position of the note or the rest in each of the time slots $S_1$, $S_2$ . . . in an X-axis direction (FIG. 5). Usually, this X-position is spaced from the left end of each time slot $S_1$, $S_2$ . . . by a predetermined distance. For example, in the case of the time slot $S_1$, the X-axis position of note G4 coincides with that of note C2. Thus, the two notes G4 and C2 are displayed at the same position in the X-axis direction. In the case where the time slot contains a note with an additional symbol such as a sharp and a flat, as in the time slot $S_3$ having the note with a sharp, the X-axis position is further displaced slightly in a right-hand direction (FIG. 5) by a distance corresponding to the width of such a sharp. Also, the Y-axis position data written into the display block DB represents the position of the note or the rest in each of the time slots $S_1$, $S_2$ . . . in a Y-axis direction (FIG. 5). In the case of the note, the Y-axis position is determined by the key code stored in the block SBB of the display block SB. And, in the case of the rest representing the time interval between the last depressed key and the newly depressed key, the Y-axis position is determined by the key code of the subsequently depressed key. Also, in the case of the rest produced while no sound is generated, the Y-axis position is represented by a predetermined position.

Figure 11:
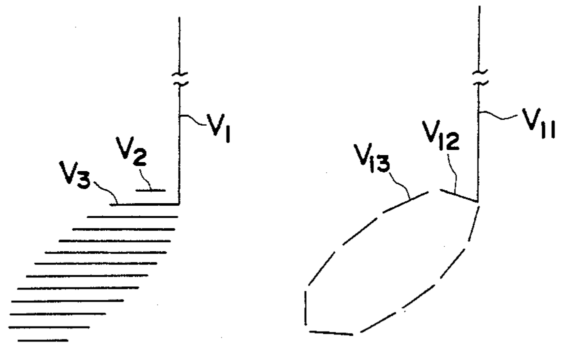
FIG. 11 is a diagrammatic illustration showing musical notes displayed on a display device.
Figure 12:
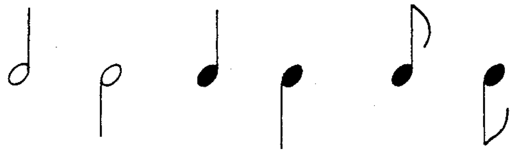
FIG. 12 is a diagrammatic illustration showing examples of musical notes to be displayed in the musical score.

The UDS code mentioned above represents the kind of musical symbols such as a note, a rest and an additional symbol. All such musical symbols are already stored in the form of vector data in a memory 17 shown in FIG. 3. For example, a quarter note is stored in the form of data representing starting and ending points of vectors $V_1$, $V_2$ . . . , as shown in FIG. 11. Also, a half note is stored in the form of data representing starting and ending points of vectors $V_{11}$, $V_{12}$ . . . , as shown in FIG. 11. Similarly, other kinds of notes such as those shown in FIG. 12 are stored in the memory 17. The UDS codes are determined in accordance with such musical symbols.

When the block SBB of the slot block SB supplied to the display data formation circuit 15 represents a note, the display data formation circuit detects the kind of this note in accordance with the key-depression duration data, and also determines the position of the stem of this note in accordance with the key code. The UDS code corresponding to the musical symbol or note so determined is written into the display block DB. Also, when the block SBB of the slot block SB represents a rest, the display data formation circuit 15 detects the kind of this rest, so that the UDS code representative of this rest is written into the display block DB.

In the case where the note has an additional symbol such as a sharp as in the time slot $S_3$ (FIG. 5), the block DBB representing this additional symbol is added to the display block DB. Data representative of the display position of this additional symbol is written into the first and second bytes of the additional block DBB corresponding respectively to the X-axis position and Y-axis position. Also, the UDS code representative of the additional symbol is written into the third byte of the additional block DBB.

Thus, each time the slot block SB is supplied to the display data formation circuit 15, the corresponding display block DB is produced. Each block DBB of the display block DB is produced in accordance with the corresponding block SBB of the slot block SB. Further, in the case where the note has any additional symbol, the block DBB representative of this additional symbol is added to the display block DB. The display block so produced is supplied to the display data processing circuit 16.

The display data processing circuit 16 comprises means for converting the X-axis position data and Y-axis position data stored in the block DBB into signals representative of X-axis and Y-axis positions of a screen of the display device 18. These X-axis and Y-axis positions of the screen are hereinafter referred to as X' and Y'-axis positions, respectively. An output signal of this conversion means is supplied to the display device 18 together with the UDS code. More specifically, in the case where the musical score shown in FIG. 5 is displayed on the display device 18, the X'-axis position of the left end of the time slot $S_1$ indicated by $X'_{-1}$ in FIG. 5 is first determined, and then the X'-axis positions of notes G4 and C2 are calculated based on the X-axis position data of the display block and the X'-axis position $X'_{-1}$. Then, the X'-axis position of the right end of the time slot $S_1$, i.e., the left end of the time slot $S_2$ indicated by $X'_{-2}$ in FIG. 5 is determined from the time slot width data stored in the display block DB and the X'-axis position $X'_{-1}$. Then, the X'-axis position of note F4 is determined from the X'-axis position $X'_{-2}$ and the X-axis position data in the display block DB corresponding to the time slot 2. The X'-axis position of the other musical symbols of the musical score are determined in the same manner. The Y'-axis position of each musical symbol is determined from the data representative of the Y'-axis position of the staff of the musical score and the Y-axis position data stored in the display block. Then, the display data processing circuit 16 feeds a signal representative of the X'-axis position and Y'-axis position of each musical symbol to the display device 18 together with the UDS code.

The display device 18 comprises a CRT display unit and a control circuit, and reads out data of the musical symbols from the memory 17 in accordance with the UDS codes supplied thereto. The data representative of the X-axis and Y-axis positions of the vectors of each musical symbol is converted into a signal representative of the corresponding X'-axis and Y'-axis position, so that the musical symbols are sequentially displayed on a CRT screen showing the staff. The display device 18 may comprise a printer or the like instead of the CRT display unit.

Figure 13:
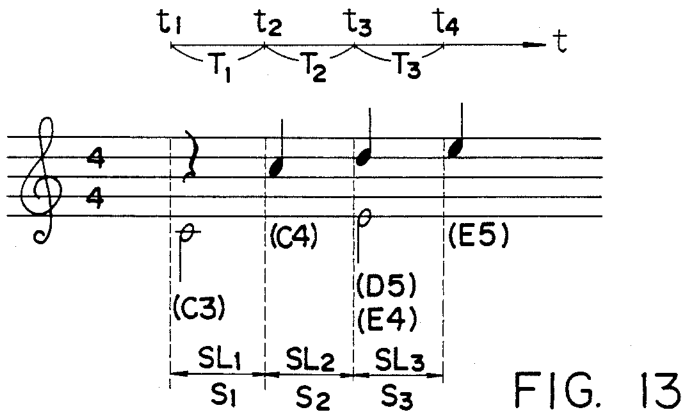
FIG. 13 is a diagrammatic illustration showing a musical score.
Figure 14:
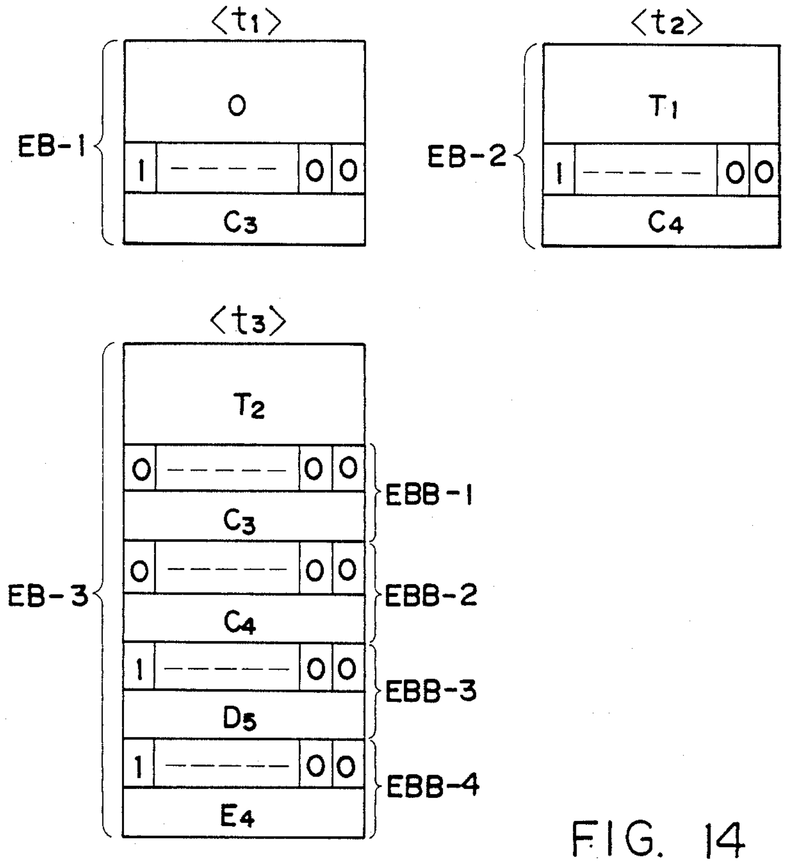
FIG. 14 is a diagrammatic illustration showing event blocks produced when a musical performance is effected in accordance with the musical score of FIG. 13.
Figure 15:
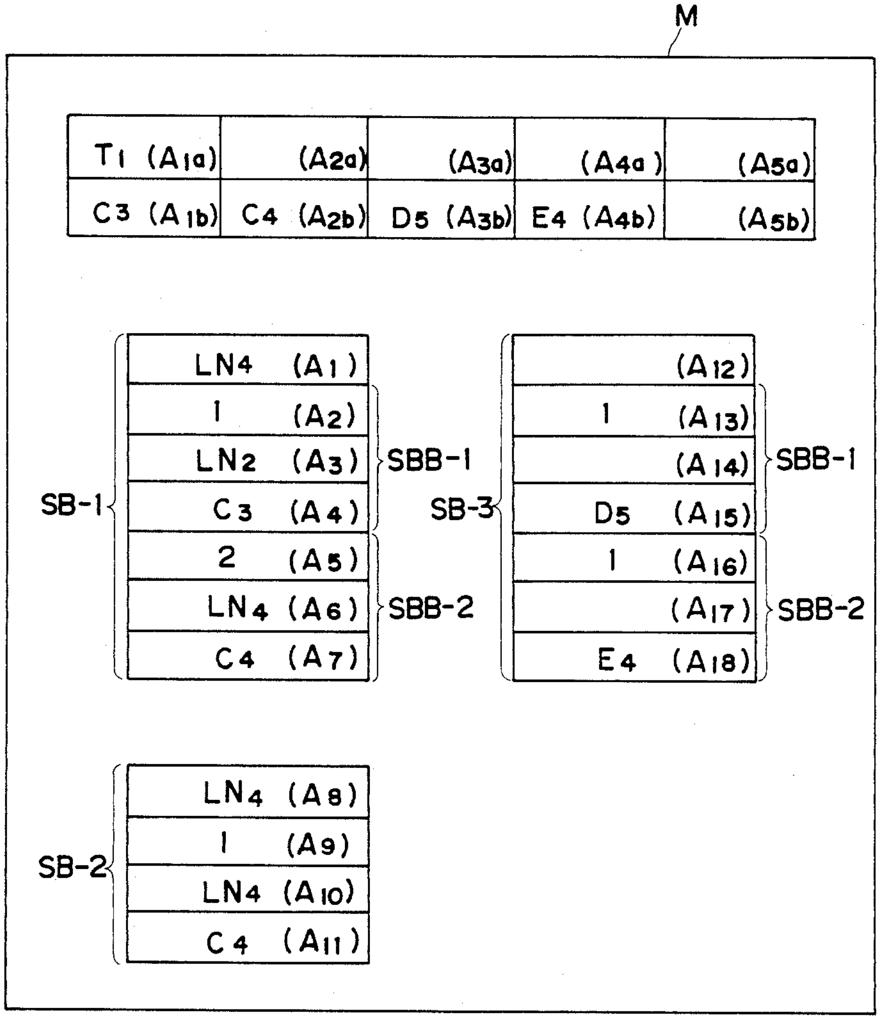
FIG. 15 is a diagrammatic illustration showing slot blocks produced in accordance with the event blocks of FIG. 14.

Another process of producing slot block SB will be described. When the keys of the piano 11 are operated in accordance with a musical score shown in FIG. 13, event blocks EB shown in FIG. 14 are produced at times $t_1$ to $t_3$. When the slot block EB-1 (FIG. 14) is produced, this slot block is detected at stage $SP_1$ (see FIG. 8). Then, the processing proceeds to stage $SP_2$ at which the timer data of the event block EB-1 is added to the data stored in areas $A_{1a}$ to $A_{5a}$ of the memory M (see FIG. 15) of the note selection circuit 13, as described above for the preceding embodiment. The memory M remains cleared at the initial condition. The addition of the timer data is effected only when the data (key code) is stored in any one of the areas $A_{1b}$ to $A_{5b}$. Therefore, this addition is not effected at this time. Then, at stage $SP_3$ it is detected whether the key concerned is in the off-state, that is to say, whether there is any block EBB of the event block EB-1 having the indicator of which the MSB is in the state of "0". In this embodiment, the result of this detection is "NO". Therefore, the processing proceeds to stage $SP_4$ at which the key code of a newly-depressed key is registered in the memory M. More specifically, the key code of the event block corresponding to key C3 is registered into area $A_{1b}$ of the memory M. The processing proceeds to stage $SP_5$ at which the area $A_{1a}$, corresponding to area $A_{1b}$ into which the key code has been written, is cleared. Then, at stage $SP_6$ it is detected that key C3 has been depressed while no other sound is produced. Then, the processing proceeds to stage $SP_7$ at which no processing is done since key C3 is depressed firstly at the beginning of the musical performance. Then, at stage $SP_8$ the type data representative of "1" is first written into area $A_2$ of the memory M, and then the key code of key C3 is written into area $A_4$ of the memory. Then, the processing proceeds to stage $SP_9$ and returns to stage $SP_1$ since the slot block SB-1 has not yet been completed at stage $SP_9$.

Next, when the event block EB-2 produced at time $t_2$ and is supplied to the note selection circuit 13, at stage $SP_2$ the timer data $T_1$ of the event block EB-2 is added to the data in the area $A_{1a}$ corresponding to the area $A_{1b}$ storing the key code, so that the data in the area $A_{1a}$ is rendered "$T_1$". Then, at stage $SP_3$ it is determined that no depressed key is released, and therefore the processing proceeds to stage $SP_4$ at which the key code of a newly depressed key $C_4$ is written into area $A_{2b}$ of the memory M. Then, at stage $SP_5$ area $A_{2a}$ of the memory M corresponding to the area $A_{2b}$ is cleared. Then, at stage $SP_6$ it is determined that key C4 is depressed while a preceding sound (key C3) is produced, and therefore the processing proceeds to stage $SP_{10}$ at which the time interval Td between the newly depressed key C4 and the precedingly depressed key C3 is detected. In this case, the time interval Td is equal to $T_1$ written as the data in the area $A_{1a}$ since the precedingly depressed key is key C3. Then, the processing proceeds to stage $SP_{11}$ at which the time interval Td is compared with a predetermined reference time Tc. In this embodiment, Td is greater than Tc since the time period $T_1$ corresponds to the duration of a quarter note. Therefore, the processing proceeds to stage $SP_{19}$ at which it is determined if the time interval Td is greater than the reference time Tx. The result at this stage is "YES" since the time interval Td is equal to the duration of a quarter note as mentioned above. Then, the processing proceeds to stage $SP_{20}$ at which a block SBB-2 representative of a rest (i.e., a rest in time slot $S_1$ of FIG. 13) corresponding to the time interval Td is added to the slot block SB-1 representative of the precedingly depressed key C3. More specifically, the type data representative of "2" is written into area $A_5$ of the memory M, and a note duration code LN4 representative of the time period Td is written into area $A_6$. Also, a key code of a subsequently depressed key C4 is written into area $A_7$. The key code written into the area $A_7$ serves to determined the display position of the rest represented by the block SBB-2. Then, the processing proceeds to stage $SP_8$ at which the slot block SB is produced in accordance with the event block EB-2. More specifically, the note duration code LN4 corresponding to the timer data representative of the time period $T_1$ is first written as the width of the time slot into area $A_1$ of a slot block SB-1. Then, type data representative of "1" is written into area $A_9$ of a slot block SB-2 corresponding to a time slot $S_2$ (FIG. 13), and the key code of key C4 is written into area $A_{11}$. Then, the processing returns to stage $SP_1$ via stage $SP_9$.

Next, when an event block EB-3 is supplied to the note selection circuit 13 at time $t_3$, at stage $SP_2$ the timer data $T_2$ is added to each of the data stored in the areas $A_{1a}$ and $A_{2a}$, so that the data in the areas $A_{1a}$ and $A_{2a}$ are rendered "$T_1+T_2$" and "$T_2$". The processing proceeds to stage $SP_{14}$ through stage $SP_3$. At stage $SP_{14}$ the data, respectively representing the on-state time periods "$T_1+T_2$" and "$T_2$" of the released keys C3 and C4, are read out, and at stage $SP_{15}$ the data are written as note duration codes LN2 and LN4 into areas $A_2$ and $A_{10}$, respectively. Then, at stage $SP_{16}$ the area $A_{1a}$, $A_{1b}$, $A_{2a}$ and $A_{2b}$ are cleared. Then, the processing proceeds to stage $SP_4$ at which the key codes of the newly depressed keys $D_5$ and $E_4$ are written into areas $A_{3b}$ and $A_{4b}$ of the memory M, respectively. Then, at stage $SP_5$ the areas $A_{3a}$ and $A_{4a}$ are cleared. Then, at stage $SP_6$ it is determined whether any preceding sound has been generated. In this embodiment, since no key code accompanying the timer data is registered in any of the areas $A_{1b}$ to $A_{5b}$, it is determined that no preceding sound is generated. Therefore, the processing proceeds through stage $SP_7$ to stage $SP_8$ at which the slot block SB-3 is produced in accordance with the depression of keys D5 and E4. Then, at stage $SP_9$ it is determined that the slot blocks SB-1 and SB-2 have already been completed. Then, the processing proceeds to stage $SP_{18}$ at which the slot blocks SB-1 and SB-2 are fed to the display data formation circuit 15. Then, the processing returns to stage $SP_1$. Then, the other slot blocks are sequentially produced in accordance with the musical performance effected by the piano 11 in a manner mentioned above, and these slot blocks are sent to the display data formation circuit 15.

Then, in a manner described above for the preceding embodiment, the display block DB is produced in accordance with each slot block SB, and the musical symbol is displayed on the display device.

Although in the above-mentioned embodiments, the musical score is displayed in accordance with the outputs from the key switches of the piano 11, the outputs from the key switches may be once stored in a recording medium such as a magnetic tape and a floppy disc so that the data stored in the recording medium can be read out to display the musical score on the display device at any time.

The musical score display system shown in FIG. 3 usually comprises digital computing means such as a microprocessor system which is programmed to produce the display data for displaying the musical score in the display device.

What is claimed is:

1. A method of processing data for a musical score display system for displaying a musical score in accordance with depression of keys on a keyboard of a musical instrument, which comprises the steps of:

(a) detecting key information of a first key including a key depression timing, a key release time and a key name;

(b) detecting the key information of a second key depressed after the depression of said first key said key information including a key depression timing, a key release timing, and a key name;

(c) determining a period between the key depression timings of said first and second keys; and (d) producing display interval data in accordance with said key information to represent a distance between the display position of said first key and of a subsequently depressed second key, said display interval data corresponding to the duration between the key depression timing and the key release timing of said first key.

2. A method of processing data for a musical score display system for displaying a musical score in accordance with depression of keys on a keyboard of a musical instrument, which comprises the steps of:

(a) detecting key information of a first key including a key depression timing, a key release timing and a key name;

(b) detecting the key information of second key depressed after the depression and the release of said first key; said by information including key depression timing, key release timing, and key name;

(c) determining a period between the key depression timing of said first and second keys;

(d) producing rest data representative of a rest corresponding to said period when said period is greater than a predetermined reference period; and (e) producing display interval data in accordance with said key information to represent a distance between the display positions of said first key and said second key, said display interval data corresponding to the durations of said rest data and said first key.

3. A method of processing data for a musical score display system in accordance with depression of keys on a keyboard comprising the steps of:

establishing for each key activated a note duration code proportional to the duration of activation of each key;

organizing the note duration codes in memory with respect to a first key activated; and displaying note symbols of each subsequent key activated at separation distances corresponding to the duration of activation of each preceding key, as indicated by said note duration codes.

4. A method according to claim 3, further comprising the step of:

displaying a rest note at a distance corresponding to the duration of activation of a preceding key when the duration between initial activation of a key and of a subsequent key is greater than a predetermined magnitude.

5. A musical score display system for a keyboard musical instrument comprising:

means for determining, for each successively depressed key, the duration for which each such key was depressed, and means for visually displaying note symbols for each depressed key, the visual spacing between the displayed note symbols for successively depressed keys corresponding to the duration for which each such key was depressed, independent of the time period between depression of consecutively depressed keys.

* * * * *